US012554225B2

(12) United States Patent
Lehmann et al.

(10) Patent No.: US 12,554,225 B2
(45) Date of Patent: Feb. 17, 2026

(54) HOROLOGICAL CALOTTE FORMING A CASING FOR HANDLING AND/OR PRESENTING A HOROLOGICAL MOVEMENT

(71) Applicant: OMEGA SA, Biel/Bienne (CH)

(72) Inventors: José Lehmann, Bevaix (CH); Thomas Stoeckli, Lüterkofen (CH)

(73) Assignee: OMEGA SA, Biel/Bienne (CH)

( * ) Notice: Subject to any disclaimer, the term of this patent is extended or adjusted under 35 U.S.C. 154(b) by 329 days.

(21) Appl. No.: 18/462,137

(22) Filed: Sep. 6, 2023

(65) Prior Publication Data

US 2024/0176303 A1 May 30, 2024

(30) Foreign Application Priority Data

Nov. 24, 2022 (EP) .................................... 22209440

(51) Int. Cl.
*G04B 37/12* (2006.01)
*G04D 1/06* (2006.01)
*G04D 7/00* (2006.01)

(52) U.S. Cl.
CPC ............... *G04B 37/12* (2013.01); *G04D 1/06* (2013.01); *G04D 7/006* (2013.01)

(58) Field of Classification Search
CPC .......... G04B 37/12; G04D 1/06; G04D 7/006; G04D 1/0021; G04D 1/066; B65D 85/40
See application file for complete search history.

(56) References Cited

U.S. PATENT DOCUMENTS

2010/0108697 A1* 5/2010 Cadau .................... B65D 81/02 220/632
2015/0346692 A1* 12/2015 Bolzt ..................... G04B 37/04 29/244

FOREIGN PATENT DOCUMENTS

| | | | |
|---|---|---|---|
| CH | 635367 A4 | 8/1969 | |
| EP | 2015148 B1 | 2/2011 | |
| FR | 1156164 A | 5/1958 | |
| FR | 2204139 A5 | 5/1974 | |

OTHER PUBLICATIONS

European Search Report of No. 22209440 dated Apr. 25, 2023.

* cited by examiner

*Primary Examiner* — Edwin A. Leon
(74) *Attorney, Agent, or Firm* — Sughrue Mion, PLLC

(57) ABSTRACT

A horological calotte (200) forming a casing for a horological movement (400) according to a calibre model in a predetermined family. The movement includes a projecting control member (410) whose distal part (411) is distant from a movement axis (DM) by a radial value (VR) specific to the model. The calotte includes a ring (220) specific to the model, which is fitted in a single angular position with a bottom (210) and a cover (230) to enclose the movement (400). Its outer shape is identical for each calibre, with reference shoulders (240) defining a calotte axis (DC). The ring offsets the movement axis relative to the calotte axis in the radial direction (DR) of the control member (410), by a value such that the distal part (411) is distant from the calotte axis by a predefined value (VP) identical for all calibres of the family.

11 Claims, 3 Drawing Sheets

HOROLOGICAL CALOTTE FORMING A CASING FOR HANDLING AND/OR PRESENTING A HOROLOGICAL MOVEMENT

CROSS REFERENCE TO RELATED APPLICATIONS

This application is claiming priority based on European Patent Application No. 22209440.1 filed on Nov. 24, 2022.

TECHNICAL FIELD OF THE INVENTION

The invention relates to a horological calotte forming a casing for handling and/or presenting a horological movement according to a calibre model belonging to a predetermined family, said movement comprising a control member projecting radially relative to a movement axis and the distal part of said control member being distant from said movement axis by a radial value specific to said model, said calotte comprising a transport ring specific to said calibre model and which is arranged to cooperate by fitting in a single angular position, on the one hand with a bottom, and on the other hand with a cover, for enclosing said movement with the exception of control member thereof passing radially, in a radial direction, through at least a first recess comprised in said transport ring.

The invention relates to a piece of production equipment for handling and/or presenting horological movements of different calibre models belonging to a predetermined family at a manufacturing, inspection or storage station.

The invention relates to the field of assembling, handling and testing horological movements.

Technological Background

The European patent document No. 2015148B1, filed by ETA SA Manufacture Horlogère Suisse, describes a system for handling and transporting horological movements of different types during manufacture, comprising different types of support rings which correspond respectively to the different types of movements and each of which are arranged to support a plate of a movement in a determined position. This system further comprises transport pallets, each having an opening arranged to removably receive any one of the support rings, the pallet opening and the outer contour of the support rings having standardised configurations adapted to suit one another, and retaining means for holding the support ring in the pallet. This transport ring comprises inner elements arranged to support a plate of the movement in a determined position, wherein the inner elements of the support ring comprise bearing surfaces and prestressing means, the support ring comprising, on the outside, reference surfaces capable of acting as bearings for the precise spatial positioning of the support ring. These prestressing means are resilient, and are arranged to deform elastically by moving away from one another when the movement is inserted, thus ensuring precise positioning of the plate of the movement in the ring.

Such a transport pallet, more commonly known as a calotte, is very useful for protecting and transporting a horological movement. In order to inspect a movement, in particular in order to inspect the running or state, this movement must be presented in a precise position in front of, or in contact with, one or more sensors. The diversity of existing calibres makes this a difficult task, however, due to the variety of calottes linked to the calibre models.

SUMMARY OF THE INVENTION

The purpose of the invention is to facilitate the inspection of horological movements of a predetermined family of calibres, by creating a family of calottes comprising reference surfaces for the positioning thereof, and such that an element of the movement is positioned on an imposed side in relation to the contour of the calotte enclosing it.

To this end, the invention relates to a horological calotte forming a casing for handling and/or presenting a horological movement according to a calibre model belonging to a predetermined family, according to claim 1.

The invention further relates to a piece of production equipment for handling and/or presenting horological movements of different calibre models belonging to a predetermined family at a manufacturing, inspection or storage station, which piece of production equipment comprises such a calotte for each calibre model of this family.

BRIEF DESCRIPTION OF THE FIGURES

The purposes, advantages and features of the invention will be better understood upon reading the following detailed description given with reference to the accompanying drawings, in which.

DETAILED DESCRIPTION OF THE INVENTION

Figure 1:
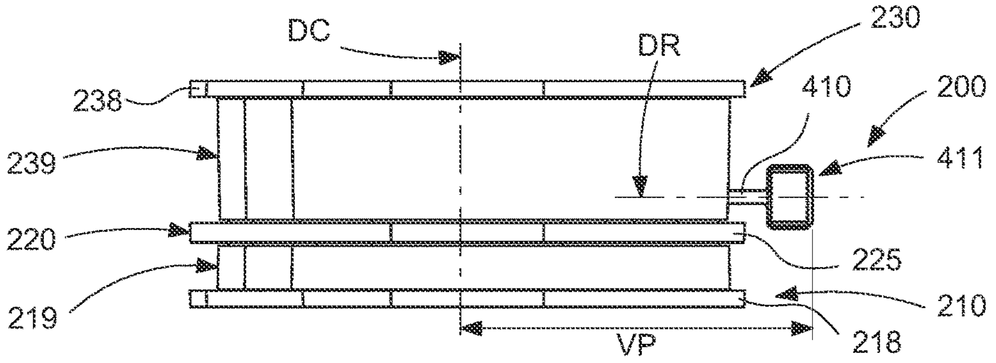
FIG. 1 diagrammatically shows a side view of a three-part calotte according to the invention, fitted together in a single angular indexing position. This calotte encloses a horological movement, according to a calibre model belonging to a predetermined family, and only the control member whereof projects in a radial direction; the distal part of this control member, in this case the end of a crown, is at a predetermined distance from a calotte axis, this predetermined distance being the same for all calibres of the family concerned.
Figure 2:
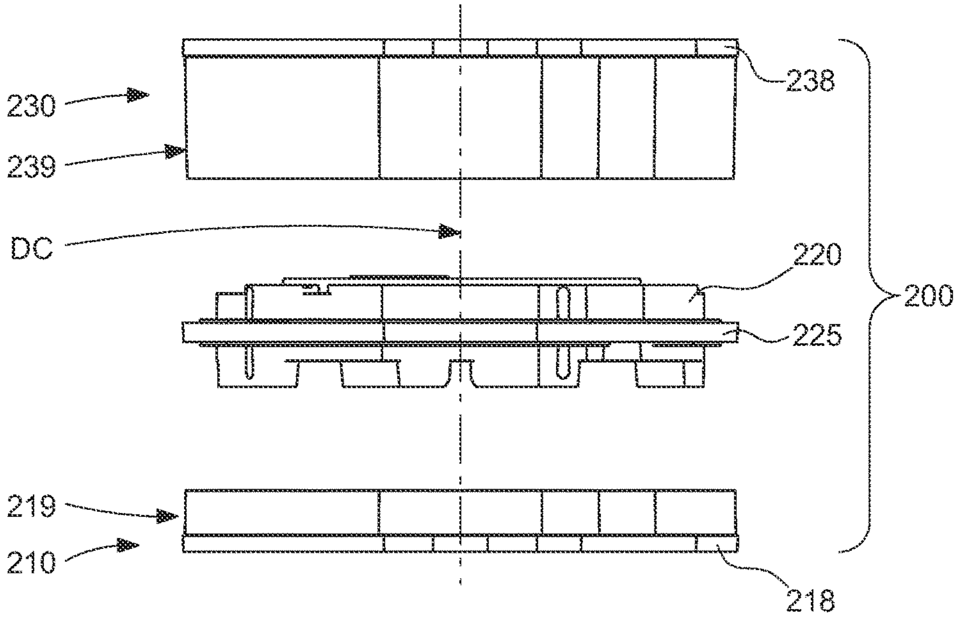
FIG. 2 diagrammatically shows an exploded side view of the calotte in FIG. 1, comprising, from bottom to top in the figure, a bottom, a transport ring and a cover, the bottom and the cover each having a flat face.
Figure 3:
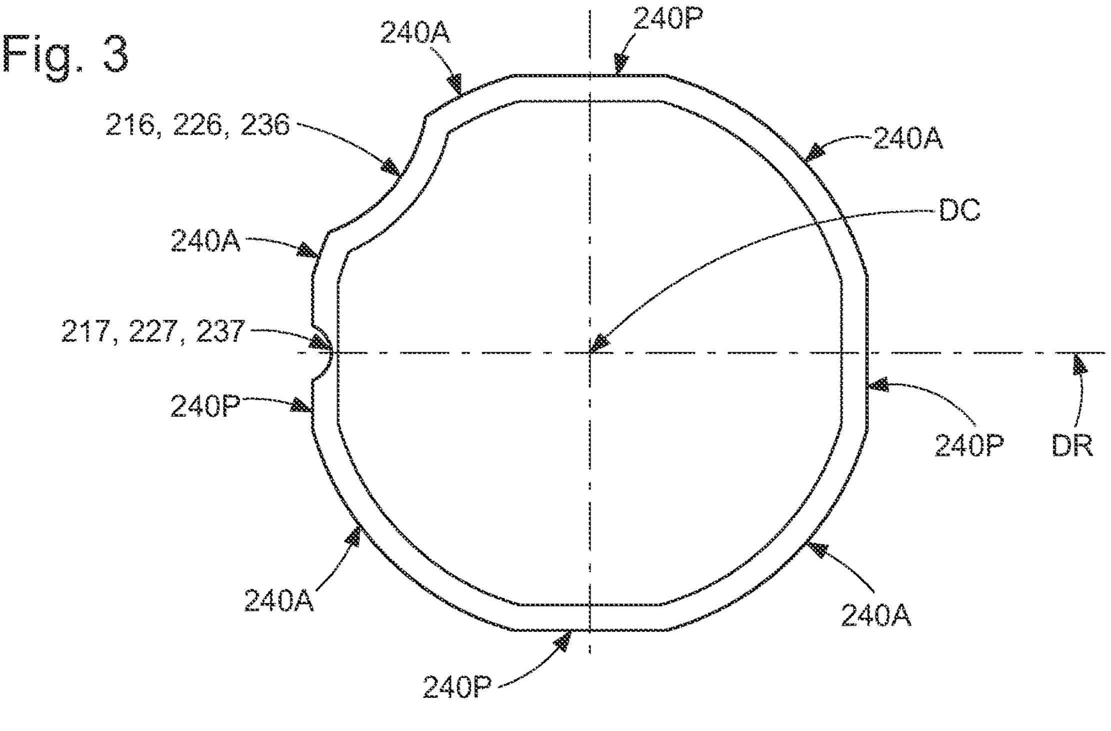
FIG. 3 diagrammatically shows a top view of the calotte in FIG. 1, in which the identical contours of the bottom, transport ring and cover composing it have flat or rounded reference surfaces defining the axis of the calotte, which is at this predetermined distance from the distal end of the control stem.
Figure 4:
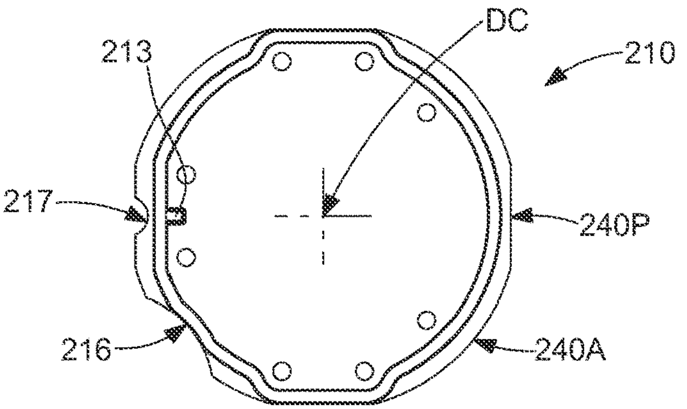
FIG. 4 diagrammatically shows a top view of the bottom in FIG. 2 resting on its flat face.
Figure 5:
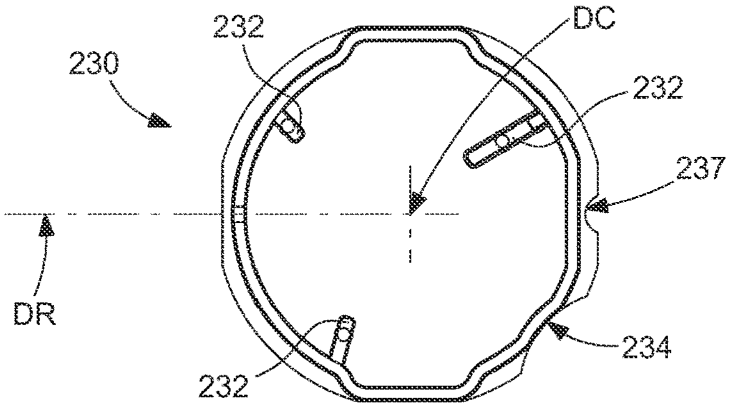
FIG. 5 diagrammatically shows a top view of the cover in FIG. 2 resting on its flat side.
Figure 6:
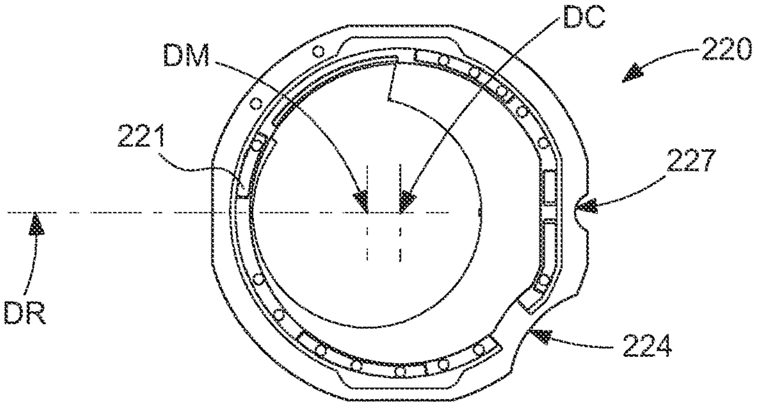
FIG. 6 diagrammatically shows a plan view of the lower face of the transport ring in FIG. 2, in the position thereof in which it angularly cooperates with the cover as shown in FIG. 5.
Figure 7:
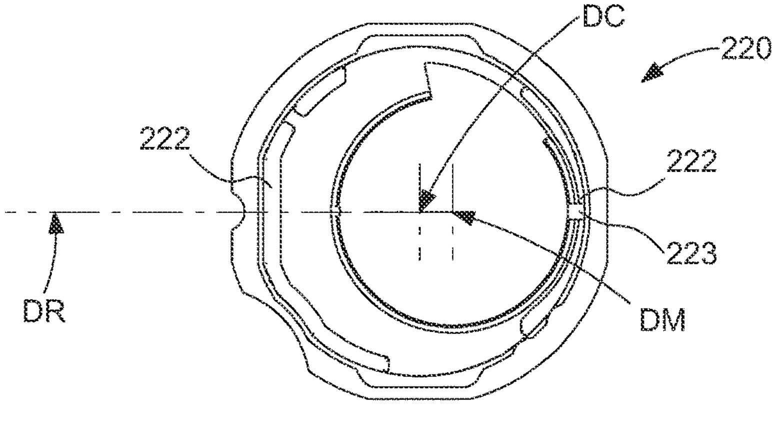
FIG. 7 diagrammatically shows a plan view of the lower face of the transport ring in FIG. 2, in the position thereof in which it angularly cooperates with the bottom as shown in FIG. 4.
Figure 8:
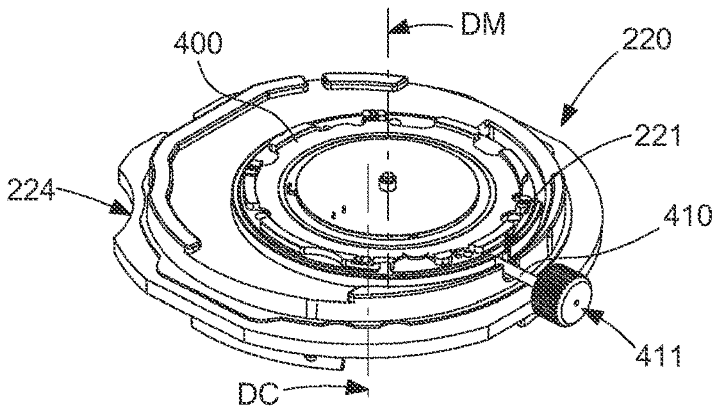
FIG. 8 diagrammatically shows a perspective view of the transport ring, the upper part whereof holds a movement, the control stem whereof passes through a first recess in the transport ring.
Figure 9:
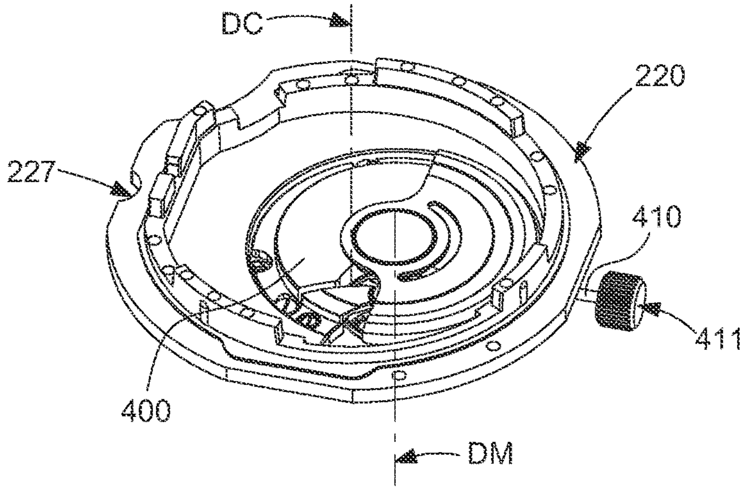
FIG. 9 shows, similarly to FIG. 8, the other side of the transport ring provided with the movement.
Figure 10:
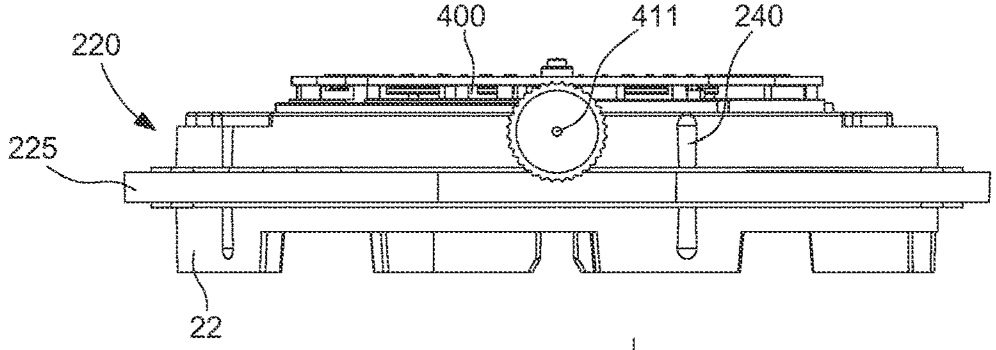
FIG. 10 diagrammatically shows a side view, frontally to the distal end of the control rod, of the transport ring provided with the movement.
Figure 11:
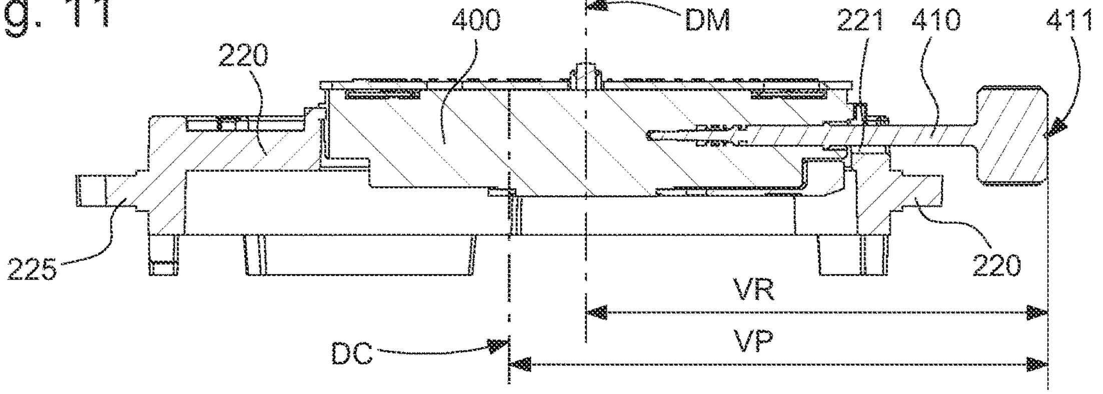
FIG. 11 diagrammatically shows a cross-section through the calotte axis and through the axis of the movement, of the transport ring provided with the movement.

The invention relates to a horological calotte 200 forming a casing for handling and/or presenting a horological movement 400 according to a calibre model belonging to a predetermined family. The movement 400 comprises a control member 410, which projects radially relative to a movement axis DM, and the distal part 411 of this control member 410, for example the end of a crown, is distant from the movement axis DM by a radial value VR specific to this calibre model of the movement 400.

The calotte 200 comprises a transport ring 220, which is specific to this calibre of the movement 400, and which is arranged to cooperate by fitting in a single angular position, on the one hand with a bottom 210, and on the other hand with a cover 230, for enclosing the movement 400 with the exception of said control member 410 thereof passing radially, in a radial direction DR, through at least a first recess 221 comprised in the transport ring 220.

According to the invention, the calotte 200 has the same outer shape for all calibres in the family, and it comprises outer reference shoulders 240, at least some whereof are symmetrical relative to a calotte axis DC.

Moreover, the transport ring 220 is arranged to position the movement axis DM of the movement 400 eccentrically relative to the calotte axis DC, in the radial direction DR defined by this first recess 221, according to an eccentricity value which is such that the distal part 411 of the control member 410 is distant from the calotte axis DC by a predefined value VP, the predefined value VP being identical for all calibres of the family.

More particularly, the cover 230 comprises a second recess 231 allowing the control member 410 to pass therethrough.

More particularly, the bottom 210 is the same for all calibres of the family.

More specifically, the bottom 210 and the cover 230 each comprise, perpendicular to the calotte axis DC, a flat outer plate 218, respectively 238, having an identical contour when projected over one another, and when the calotte 200 is in the closed position where the bottom 210 and the cover 230 are angularly indexed in position relative to the transport ring 220 and fitted therewith.

More particularly, the transport ring 220 comprises an outer lip 225 which, when the calotte 200 is in the closed position in which the bottom 210 and the cover 230 are angularly indexed in position relative to the transport ring 220 and fitted therewith, projects from shoulders 219, 239 comprised in the bottom 210 and the cover 230 respectively.

More particularly, the outer lip 225 has an identical contour to that of the flat outer plates 218, 238 of the bottom 210 and of the cover 230 when projected over one another, and when the calotte 200 is in the closed position wherein the bottom 210 and the cover 230 are angularly indexed in position relative to the transport ring 220 and fitted therewith.

More particularly, the outer lip 225 and the flat outer plates 218, 238 each comprise a positioning notch 227, 217, 237, the positioning notches 227, 217, 237 being aligned, parallel to the calotte axis DC, when the calotte 200 is in the closed position wherein the bottom 210 and the cover 230 are angularly indexed in position relative to the transport ring 220 and fitted therewith. Moreover, the outer lip 225 and the flat outer plates 218, 238, each comprise a locating notch 226, 216, 236 to distinguish the dial side from the bridge side of the movement 400, the locating notches 226, 216, 236 being aligned, parallel to the calotte axis DC, when the calotte 200 is in the closed position.

More particularly, the cover 230 comprises inner cover projections 232, which are arranged to support the transport ring 220 in an axial position, in the direction of the calotte axis DC, when the calotte 200 is in a position wherein the cover 230 is angularly indexed in position relative to the transport ring 220 and fitted therewith.

More particularly, the transport ring 220 comprises inner ring projections 222, which are arranged to support the bottom 210 in an axial position, in the direction of the calotte axis DC, when the calotte 200 is in a position wherein the bottom 210 is angularly indexed in position relative to the transport ring 220 and fitted therewith.

More particularly, the transport ring 220 comprises a ring groove 223 or lug for cooperation with a bottom groove or bottom lug 213, respectively, comprised in the bottom 210, for the relative angular orientation of the bottom 210 with respect to the transport ring 220 when the calotte 200 is in a position wherein the bottom 210 is angularly indexed in position relative to the transport ring 220 and fitted therewith.

More particularly, the outer lip 225 is offset, in the direction of the calotte axis DC, relative to the calotte 200, when the calotte 200 is in the closed position wherein the bottom 210 and the cover 230 are angularly indexed in position relative to the transport ring 220 and fitted therewith, to delimit, on the side of the cover 230, an upper chamber for receiving the movement 400 on an upper face of the transport ring 220, arranged so as to make the dial side of the movement 400 visible and to ensure radial passage of the control member 410, and, on the side of the bottom 210, a lower chamber, of smaller volume than the upper chamber, and delimited by a lower face of the transport ring 220 arranged so as to make the bridge side of the movement 400 visible.

More particularly, the bottom 210 and the cover 230 are transparent to allow for optical inspection of the movement 400.

More particularly, the bottom 210 and the cover 230 are sound-isolating to sound-isolate a movement 400 contained in the calotte 200 from other sound sources in its vicinity, for acoustic inspection of the movement 400.

More particularly, the bottom 210, the transport ring 220 and the cover 230 are arranged to fit together two-by-two with elastic clamping.

The invention also relates to a piece of production equipment 2000 for handling and/or presenting horological movements 400 of different calibre models belonging to a predetermined family at a manufacturing, inspection or storage station. According to the invention, this piece of production equipment 2000 comprises, for each calibre of this family, at least one such horological calotte 200. This calotte 200 comprises a transport ring 220 and a cover 230 specific to the calibre. Moreover, in their closed position, wherein the bottom 210 and the cover 230 are angularly indexed in position relative to the transport ring 220 and fitted therewith, all the calottes 200 comprised in the piece of equipment 2000 have identical outer dimensions. Moreover, when a calotte 200 is in the closed position enclosing a movement 400, the distal part 411 of the control member 410 is distant from the calotte axis DC by the predefined value VP, which is identical for all calibres of the family, and oriented in a radial direction DR with a single angular position in relation to positioning means and locating means that are identical for all the calottes 200 comprised in the piece of equipment 2000.

The invention claimed is:

1. A horological calotte forming a casing for handling and/or presenting a horological movement according to a calibre model belonging to a predetermined family of calibres, said movement comprising a control member projecting radially relative to a movement axis (DM), and the distal part of said control member is distant from said movement axis (DM) by a radial value (VR) specific to said calibre model, said calotte comprising a transport ring specific to said calibre model of said movement, and which is arranged to cooperate by fitting in a single angular position; on the one hand with a bottom, and with a cover, for enclosing said movement with the exception of said control member thereof passing radially, in a radial direction (DR), through at least a first recess comprised in said transport ring, wherein said calotte has the same outer shape for all calibres of said predetermined family, and comprises outer reference shoulders (240), at least some thereof are symmetrical relative to a calotte axis (DC), wherein said transport ring is arranged to position said movement axis (DM) of said movement eccentrically relative to said calotte axis (DC), in said radial direction (DR) defined by said first recess, according to an eccentricity value such that said distal part of said control member is distant from said calotte axis (DC) by a predefined value (VP), said predefined value (VP) being identical for all calibres of said family, wherein said bottom and said cover each comprise, perpendicular to said calotte axis (DC), a flat outer plate, having an identical contour when projected over one another, and when said calotte is in the closed position where said bottom and said cover are angularly indexed in position relative to said transport ring and fitted therewith, wherein said transport ring comprises an outer lip which, when said calotte is in the closed position in which said bottom and said cover are angularly indexed in position relative to said transport ring and fitted therewith, projects from shoulders comprised in said bottom and said cover respectively, wherein said outer lip has an identical contour to that of said flat outer plates of said bottom and of said cover when projected over one another, and when said calotte is in the closed position wherein said bottom and said cover are angularly indexed in position relative to said transport ring and fitted therewith, wherein said outer lip and said flat outer plates each comprise a positioning notch, said positioning notches being aligned, parallel to said calotte axis (DC), when said calotte is in the closed position wherein said bottom and said cover are angularly indexed in position relative to said transport ring and fitted therewith, and wherein said outer lip and said flat outer plates, each comprise a locating notch to distinguish the dial side from a bridge side of said movement, said locating notches being aligned, parallel to said calotte axis (DC), when said calotte is in said closed position.

2. The horological calotte according to claim 1, wherein said cover comprises a second recess allowing said control member to pass therethrough.

3. The horological calotte according to claim 1, wherein said bottom is the same for all said calibres of said family.

4. The horological calotte according to claim 1, wherein said cover comprises inner cover projections arranged to support said transport ring in an axial position, in the direction of said calotte axis (DC), when said calotte is in a position wherein said cover is angularly indexed in position relative to said transport ring and fitted therewith.

5. The horological calotte according to claim 1, wherein said transport ring comprises ring projections arranged to support said bottom in an axial position, in the direction of said calotte axis (DC), when said calotte is in a position wherein said bottom is angularly indexed in position relative to said transport ring and fitted therewith.

6. The horological calotte according to claim 1, wherein said transport ring comprises a ring groove or lug for cooperation with a bottom groove or bottom lug, respectively, comprised in said bottom, for the relative angular orientation of said bottom with respect to said transport ring when said calotte is in a position wherein said bottom is angularly indexed in position relative to said transport ring and fitted therewith.

7. The horological calotte according to claim 1, wherein said outer lip is offset, in said calotte direction (DC), relative to said calotte, when said calotte is in the closed position wherein said bottom and said cover are angularly indexed in position relative to said transport ring and fitted therewith, to delimit, on the side of said cover, an upper chamber for receiving said movement on an upper face of said transport ring, arranged so as to make the dial side of said movement visible and to ensure radial passage of said control member, and, on the side of said bottom, a lower chamber, of smaller volume than said upper chamber, and delimited by a lower face of said transport ring arranged so as to make the bridge side of said movement visible.

8. The horological calotte according to claim 1, wherein said bottom and said cover are transparent to allow for optical inspection of said movement.

9. The horological calotte-according to claim 1, wherein said bottom and said cover are sound-isolating to sound-isolate a said movement contained in said calotte from other sound sources in its vicinity, for acoustic inspection of said movement.

10. The horological calotte according to claim 1, wherein said bottom, said transport ring, and said cover are arranged to fit together two-by-two with elastic clamping.

11. A piece of production equipment for handling and/or presenting hological movements of different calibre models belonging to a predetermined family at a manufacturing, inspection or storage station, wherein said piece of production equipment comprises, for each said calibre, at least one said horological calotte according to claim 1, comprising said transport ring and a said cover specific to said calibre, and wherein, in their closed position, wherein said bottom and said cover are angularly indexed in position relative to said transport ring and fitted therewith, all said calottes comprised in said piece of equipment have identical outer dimensions, and wherein, when said calotte is in said closed position enclosing a said movement, said distal part of said control member is distant from said calotte axis (DC) by said predefined value (VP), which is identical for all calibres of said family, and oriented in a radial direction (DR) with a single angular position in relation to positioning means and locating means which are identical for all said calottes comprised in said piece of equipment.

* * * * *